(12) United States Patent
Duong et al.

(10) Patent No.: US 9,097,186 B2
(45) Date of Patent: *Aug. 4, 2015

(54) BEVEL GEAR ARRANGEMENT FOR AXIAL ACCESSORY GEARBOX

(75) Inventors: Hung Duong, Unionville, CT (US); Gabriel L. Suciu, Glastonbury, CT (US); Christopher M. Dye, San Diego, CA (US)

(73) Assignee: United Technologies Corporation, Hartford, CT (US)

( * ) Notice: Subject to any disclaimer, the term of this patent is extended or adjusted under 35 U.S.C. 154(b) by 779 days.

This patent is subject to a terminal disclaimer.

(21) Appl. No.: 13/360,752

(22) Filed: Jan. 29, 2012

(65) Prior Publication Data

US 2013/0193688 A1 Aug. 1, 2013

(51) Int. Cl.
*F02C 7/32* (2006.01)
*F02C 7/36* (2006.01)

(52) U.S. Cl.
CPC .... *F02C 7/32* (2013.01); *F02C 7/36* (2013.01)

(58) Field of Classification Search
CPC ............... F02C 7/32; F02C 7/36; F16H 1/12; F16H 1/14; F16H 1/20; F16H 1/24
USPC ....................... 74/665 GB, 665 GC
See application file for complete search history.

(56) References Cited

U.S. PATENT DOCUMENTS

| | | | |
|---|---|---|---|
| 4,287,790 | A | 9/1981 | Fujiwara et al. |
| 5,878,492 | A | 3/1999 | Gleasman et al. |
| 6,443,035 | B1 | 9/2002 | Scardullo |
| 7,213,488 | B2 | 5/2007 | Daniel |
| 7,500,365 | B2 | 3/2009 | Suciu et al. |
| 7,654,087 | B2 | 2/2010 | Ullyott |
| 8,347,637 | B2 * | 1/2013 | Suciu et al. ............ 60/802 |
| 8,490,410 | B2 * | 7/2013 | Suciu et al. ............ 60/802 |
| 8,490,411 | B2 * | 7/2013 | Suciu et al. ............ 60/802 |
| 2005/0103931 | A1 | 5/2005 | Morris et al. |
| 2009/0290976 | A1 | 11/2009 | Suciu et al. |
| 2011/0289936 | A1 | 12/2011 | Suciu et al. |

* cited by examiner

*Primary Examiner* — William H Rodriguez
*Assistant Examiner* — Arun Goyal
(74) *Attorney, Agent, or Firm* — Carlson, Gaskey & Olds, PC

(57) ABSTRACT

An accessory box for a gas turbine engine has an input gear to be driven by an input shaft. The input gear is engaged to drive a first driven gear on one radial side of a drive axis of the input gear. The first gear drives at least a second driven gear on one radial side of the drive axis, with at least one accessory driven by one of the first and second driven gears. The second driven gear drives a bevel gear arrangement to drive a third driven gear on an opposed side of the drive axis of the input gear. The third driven gear drives at least a second accessory. The accessories are associated with a gas turbine engine.

20 Claims, 3 Drawing Sheets

BEVEL GEAR ARRANGEMENT FOR AXIAL ACCESSORY GEARBOX

BACKGROUND OF THE INVENTION

This application relates to a drive arrangement for use in an accessory gearbox associated with a gas turbine engine.

Gas turbine engines are known, and typically include a compressor compressing air and delivering it into a combustion section. The air is mixed with fuel and combusted, and products of that combustion are driven over turbine rotors, driving the turbine rotors to rotate.

Any number of accessories are associated with a gas turbine engine, and will typically draw power from rotation of the turbine rotors through a tower shaft. The tower shaft drives the accessories at a location adjacent to the gas turbine engine. Historically, the accessory were spaced circumferentially about a central drive axis of the tower shaft. This sometimes resulted in an undesirably large radial envelope.

More recently it has been proposed to space the accessories axially along the drive axis of the tower shaft. In the proposed arrangements, a layshaft extends along an axial dimension, and the accessories are driven off of the layshaft at axially spaced locations.

SUMMARY OF THE INVENTION

In a featured embodiment, an accessory box for a gas turbine engine has an input gear to be driven by an input shaft. The input gear is engaged to drive a first driven gear on one radial side of a drive axis. The first gear drives at least a second driven gear on one radial side of the drive axis, with at least one accessory driven by one of the first and second driven gears. The second driven gear drives a bevel gear arrangement to drive a third driven gear on an opposed side of the drive axis. The third driven gear drives at least a second accessory. The accessories are associated with a gas turbine engine.

In an embodiment according to the previous embodiment, the first driven gear engages and drives an idler gear which in turn drives the second driven gear.

In an embodiment according to the previous embodiment, the first and second drive gears each drive an associated accessory.

In an embodiment according to the previous embodiment, at least one of the accessories is a starter for selectively driving the input gear.

In an embodiment according to the previous embodiment, the bevel gear arrangement includes a first bevel gear driven to rotate on one radial side. The first bevel gear drives a second bevel gear, and the second bevel gear drives a third bevel gear. The third bevel gear is on an opposed side of the drive axis, and with the first bevel gear being driven to rotate by the second driven gear, and the third bevel gear driving the third driven gear.

In an embodiment according to the previous embodiment, the second bevel gear is positioned on a remote side of a drive axis of the first and third bevel gears from the input gear.

In an embodiment according to the previous embodiment, the second bevel gear is positioned to be intermediate a drive axis of the first and third bevel gears and the input gear.

In an embodiment according to the previous embodiment, a gear fixed to rotate with the first bevel gear is driven by the second driven gear, and the third bevel gear is fixed to rotate with a gear that drives the third driven gear.

In an embodiment according to the previous embodiment, the gear fixed to rotate with the first bevel gear is directly driven by the second driven gear, and the gear fixed to rotate with the third bevel gear directly drives the third driven gear.

In an embodiment according to the previous embodiment, the third driven gear engages at least a fourth driven gear. The third and fourth driven gears are each associated to drive an accessory.

In an embodiment according to the previous embodiment, an outer diametric envelope of the input gear may be defined. The opposed side of the drive axis is outside the diametric envelope.

In an embodiment according to the previous embodiment, the input gear is a bevel gear driving a driven bevel gear associated with the first driven gear.

In another featured embodiment, a gas turbine engine has a compressor, a combustor and a turbine section. An accessory box has an input gear to be driven by an input shaft. The input gear is engaged to drive a first driven gear on one radial side of a drive axis of the input gear. The first gear drives at least a second driven gear on one radial side of the drive axis, with at least one accessory driven by one of the first and second driven gears. The second driven gear drives a bevel gear arrangement to drive a third driven gear on an opposed side of the drive axis of the input gear. The third driven gear drives at least a second accessory. The accessories are be associated with a gas turbine engine.

In an embodiment according to the previous embodiment, the bevel gear arrangement includes a first bevel gear driven to rotate on one radial side. The first bevel gear drives a second bevel gear, and the second bevel gear drives a third bevel gear, with the third bevel gear being on the opposed side of the drive axis. The first bevel gear is driven to rotate by the second driven gear, and the third bevel gear drives the third driven gear.

In an embodiment according to the previous embodiment, a gear fixed to rotate with the first bevel gear is driven by the second driven gear. The third bevel gear is fixed to rotate with a gear that drives the third driven gear.

In an embodiment according to the previous embodiment, the gear fixed to rotate with the first bevel gear is directly driven by the second driven gear, and the gear fixed to rotate with the third bevel gear directly drives the third driven gear.

In an embodiment according to the previous embodiment, an outer diametric envelope of the input gear may be defined. The opposed side of the drive axis is outside the diametric envelope.

In an embodiment according to the previous embodiment, accessories include at least a starter for selectively starting the gas turbine engine.

In an embodiment according to the previous embodiment, the accessories also include a generator for generating electricity from rotation of the turbine section.

In an embodiment according to the previous embodiment, the accessories also include a lube pump and a fuel pump for supplying lubrication and fuel to the gas turbine engine.

These and other features of this application will be best understood from the following specification and drawings, the following of which is a brief description.

DETAILED DESCRIPTION

Figure 1:
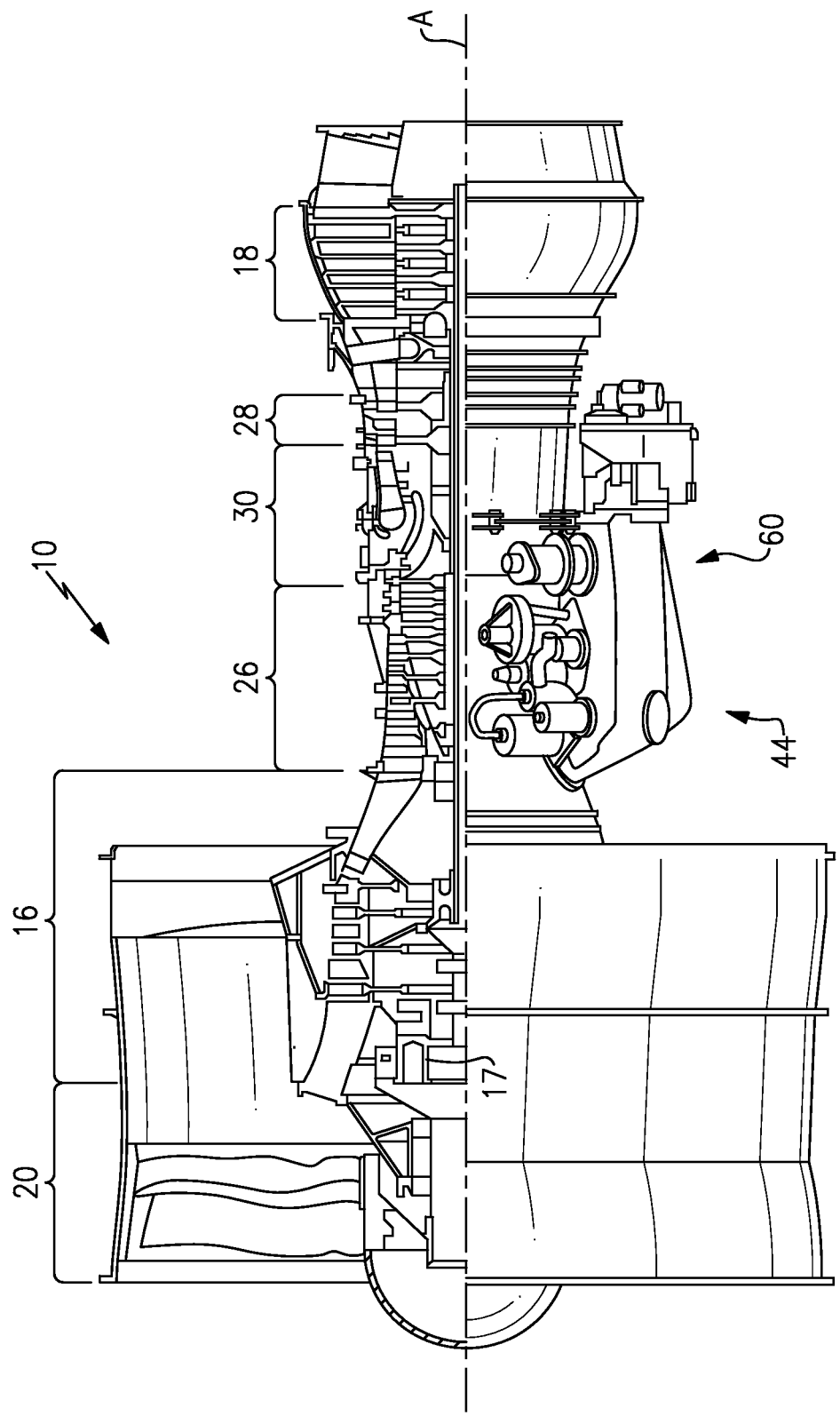
FIG. 1 schematically shows a gas turbine engine.

A gas turbine engine 10 is illustrated in FIG. 1 having a fan section 20 delivering air into a compressor section 16, and for bypass air, as known. Air from the low pressure compressor section 16 passes into a high pressure compressor section 26, and then into a combustor section 30. From the combustor section 30, products of combustion pass downstream over a high pressure turbine section 28, and a low pressure turbine section 18. A gear reduction 17 is shown transmitting rotation from a shaft driving the low pressure compressor 16, and the fan section 20, such that the two can rotate at different speeds relative to each other. While one exemplary gas turbine engine is illustrated in this Figure, the teachings of this application would extend to other gas turbine engines for any number of other applications and arrangements.

An accessory gearbox 60 is mounted to a case structure 44 generally parallel to the engine axis of rotation A. The accessory gearbox 60 may include accessory components such as an Air Turbine Starter (ATS), a deoiler (D), a hydraulic pump (HP), an oil pump (OP), an integrated drive generator (IDG), a permanent magnet alternator (PMA), a fuel pump module (FMP), and others. It should be understood, that any number and type of accessory components may alternatively or additionally be provided.

In the FIG. 1 arrangement, a tower shaft is driven by the turbine shaft to drive a number of accessories.

Figure 2:
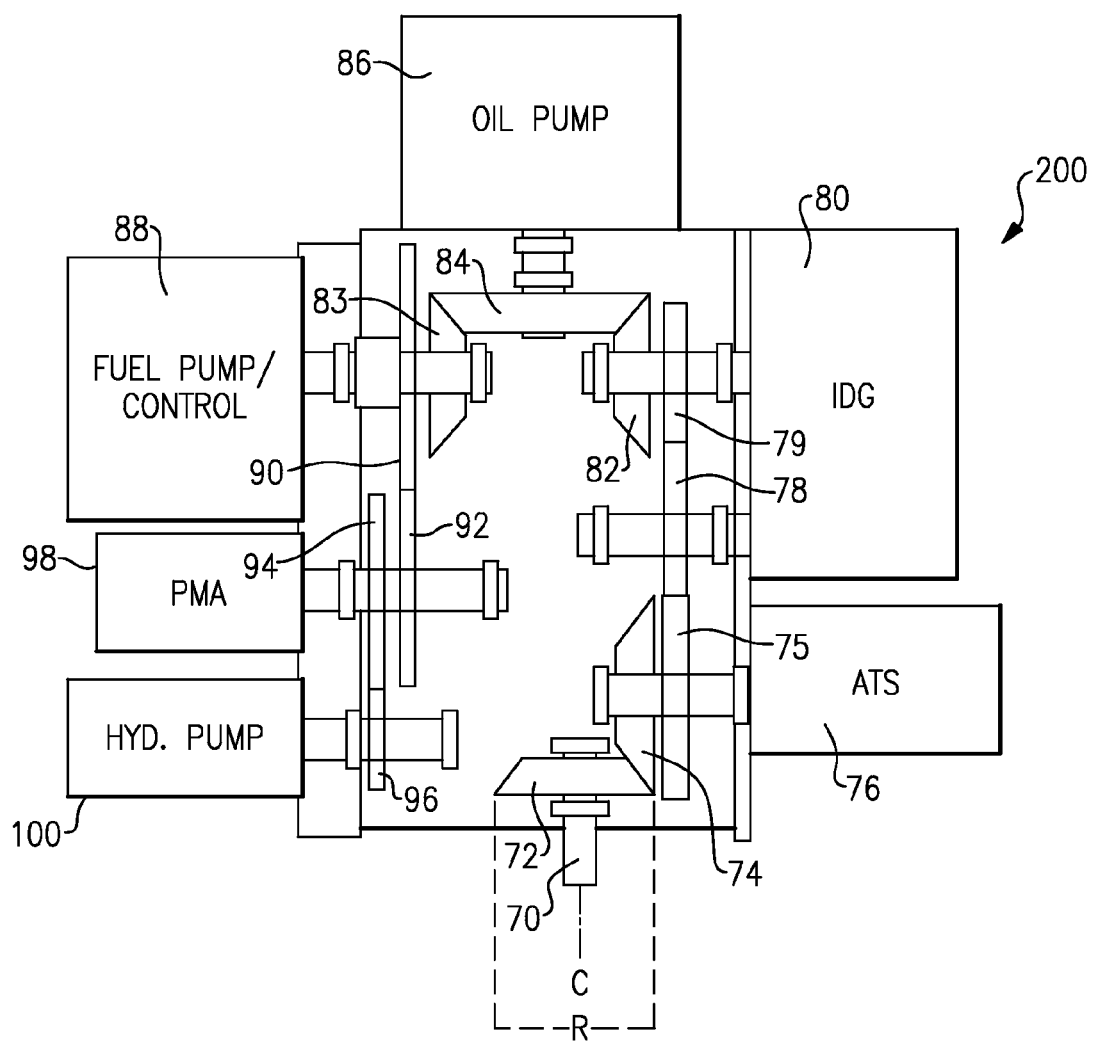
FIG. 2 shows a first drive arrangement.

FIG. 2 shows an embodiment of an axial gearbox 200 wherein the tower shaft 70 drives a bevel gear 72, which may be known as an input gear for purposes of this application. The bevel gear 72 engages another bevel gear 74. The bevel gear 74 drives a gear 75, and drives an accessory 76. In fact, the accessory 76 may be a starter, which can alternatively be driven to drive the gear 74, and hence the tower shaft 70. It is known in the prior art that a starter can be arranged within such an accessory gearbox to selectively drive the tower shaft to start rotation of the turbines, fans, and compressors, and start the gas turbine engine.

The gear 75 may drive an idler gear 78 which in turn drives another gear 79. Gear 79 may drive an accessory 80, which may be an integrated drive generator for generating electricity from rotation of the turbine rotors.

A bevel gear 82 rotates with the gear 79 and engages another bevel gear 84 which drives an accessory, which may be lube pump shown at 86. The bevel gear 84 in turn drives another bevel gear 83 which then drives a gear 90, and drives an accessory 88. The accessory 88 may be a fuel pump. The combination of the three bevel gears 82, 84, 83 "turns" the rotation from one side of a centerline C of the tower shaft 70, across a diametrical envelope R of the bevel gear 72, such that rotation is now transmitted back toward the tower shaft 70 by gear 90 being driven, and driving a gear 92, which rotates with a gear 94, which then ultimately drives a gear 96. Gears 92/94 drive accessory 98, which may be a permanent magnet alternator. Gear 94 drives gear 96 to drive accessory 100, which may be a hydraulic pump.

The compound gears on each shaft (83/90 or 92/94, for example) allows a speed change between the rotation speed of the drive for the accessories driven by the associated drive shafts.

The overall arrangement of the drive that passes axially along one radial side of the tower shaft 70, crosses the centerline of the tower shaft 70, and then comes back axially toward the tower shaft 70, results in a tighter axial dimension for the overall gearbox 200. In this manner, the gearbox may be positioned in a smaller axial space, such that it is associated with cooler locations on the gas turbine engine, such as the compressor case.

Figure 3:
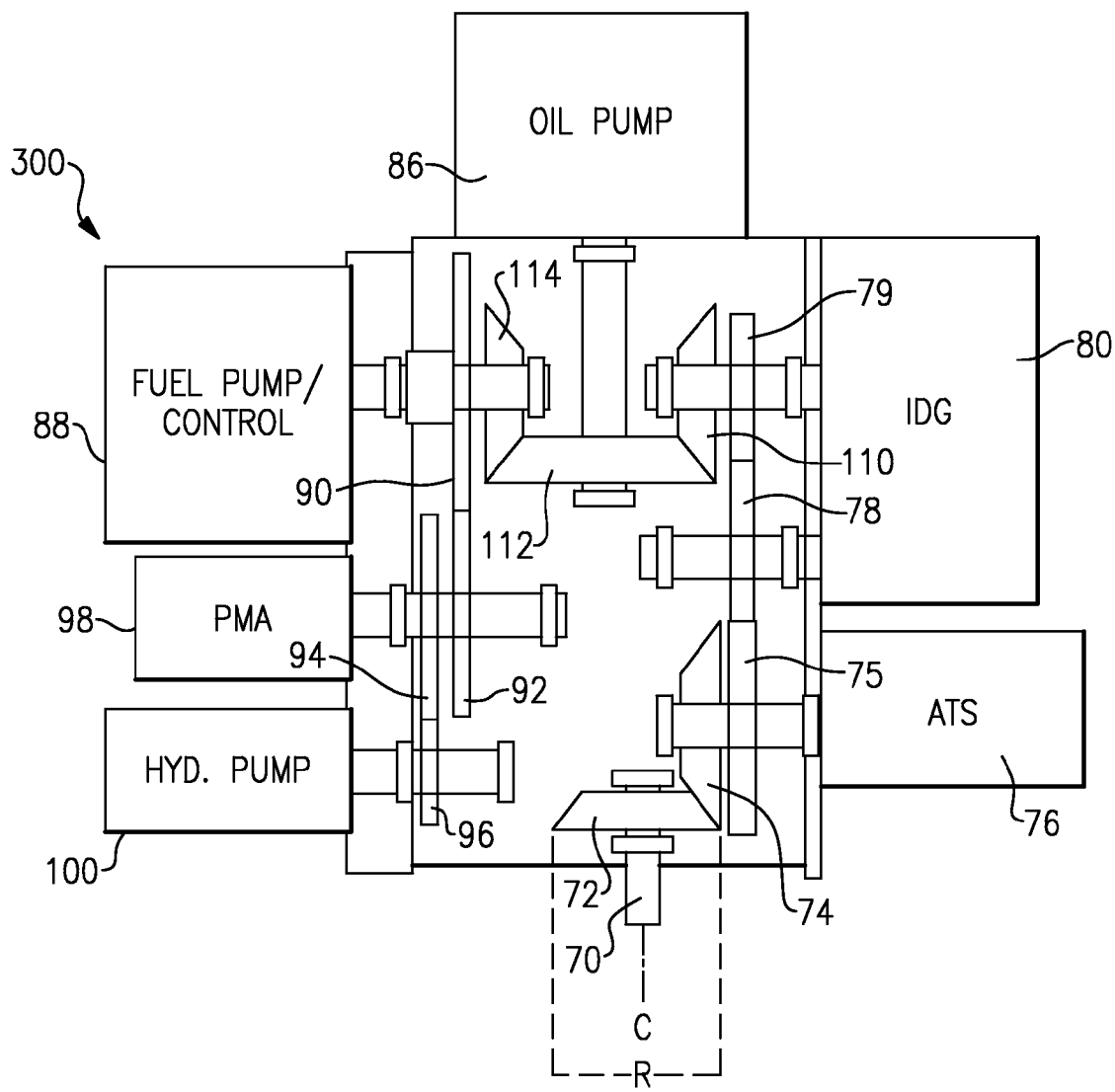
FIG. 3 shows a second drive arrangement.

FIG. 3 shows an alternative embodiment 300, wherein much of the accessory drive is common to the FIG. 2 embodiment. However, the lube pump 86 is driven with a bevel gear 112 which is positioned to be axially closer to the tower shaft 70 then the bevel gear 110 that drives it, and the bevel gear 114 that it drives. That is, in the FIG. 2 embodiment, the bevel gear 84 is on an opposed side of drive axes of the gears 82 and 83 relative to the tower shaft 70, while in the FIG. 3 embodiment, the bevel gear 112 is intermediate the drive axes of the gears 110 and 114 in the tower shaft 70. While the bevel gears as all shown with their axes of rotation at right angles to each other, other arrangements may be utilized. All that is required is the use of the bevel gears allows the drives to cross the axis of rotation of the tower shaft, and move axially along in an opposed direction.

While embodiments have been disclosed, a worker of ordinary skill in this art would recognize that certain modifications would come within the scope of this invention. For that reason, the following claims should be studied to determine the true scope and content of this invention.

The invention claimed is:

1. An accessory box for a gas turbine engine comprising: an input gear to be driven by an input shaft;
   said input gear engaged to drive a first driven gear on one radial side of a drive axis of said input gear;
   said first driven gear driving at least a second driven gear on said one radial side of said drive axis, with at least one accessory driven by one of said first driven gear and said second driven gear;
   said second driven gear driving a bevel gear arrangement to drive a third driven gear on an opposed side of said drive axis of said input gear, and said third driven gear driving at least a second accessory; and
   said one accessory and said second accessory to be associated with a gas turbine engine.

2. The accessory box as set forth in claim 1, wherein said first driven gear engages and drives an idler gear which in turn drives said second driven gear.

3. The accessory box as set forth in claim 1, wherein said first driven gear and said second driven gear each drive an associated accessory.

4. The accessory box as set forth in claim 3, wherein at least one of said one accessory and said second accessory is a starter for selectively driving said input gear.

5. The accessory box as set forth in claim 1, wherein said bevel gear arrangement including a first bevel gear driven to rotate on said one radial side, said first bevel gear driving a second bevel gear, and said second bevel gear driving a third bevel gear, with said third bevel gear being on said opposed side of said drive axis, and with said first bevel gear being driven to rotate by said second driven gear, and said third bevel gear driving said third driven gear.

6. The accessory box as set forth in claim 5, wherein said second bevel gear is positioned on a remote side of a drive axis of said first bevel gear and third bevel gear from said input gear.

7. The accessory box as set forth in claim 5, wherein said second bevel gear is positioned to be intermediate a drive axis of said first bevel gear and third bevel gear and said input gear.

8. The accessory box as set forth in claim 5, wherein a gear fixed to rotate with said first bevel gear is driven by said second driven gear, and said third bevel gear is fixed to rotate with an another gear that drives said third driven gear.

9. The accessory box as set forth in claim 8, wherein the gear fixed to rotate with said first bevel gear is directly driven by said second driven gear, and said another gear fixed to rotate with said third bevel gear directly drives said third driven gear.

10. The accessory box as set forth in claim 1, wherein said third driven gear engages at least a fourth driven gear, and said third driven gear and said fourth driven gear each being associated to drive an accessory.

11. The accessory box as set forth in claim 1, wherein an outer diametric envelope of said input gear may be defined, and said opposed side of said drive axis is outside said diametric envelope.

12. The accessory box as set forth in claim 1, wherein said input gear is a bevel gear, said input gear driving a driven bevel gear associated with said first driven gear.

13. A gas turbine engine comprising:
a compressor, a combustor and a turbine section;
an accessory box having an input gear to be driven by an input shaft;
said input gear engaged to drive a first driven gear on one radial side of a drive axis of said input gear;
said first driven gear driving at least a second driven gear on said one radial side of said drive axis, with at least one accessory driven by one of said first driven gear and second driven gear;
said second driven gear driving a bevel gear arrangement to drive a third driven gear on an opposed side of said drive axis of said input gear, and said third driven gear driving at least a second accessory; and
said one accessory and said second accessory to be associated with a gas turbine engine.

14. The gas turbine engine as set forth in claim 13, wherein said bevel gear arrangement including a first bevel gear driven to rotate on said one radial side, said first bevel gear driving a second bevel gear, and said second bevel gear driving a third bevel gear, with said third bevel gear being on said opposed side of said drive axis, and with said first bevel gear being driven to rotate by said second driven gear, and said third bevel gear driving said third driven gear.

15. The gas turbine engine as set forth in claim 13, wherein a gear fixed to rotate with said first bevel gear is driven by said second driven gear, and said third bevel gear is fixed to rotate with an another gear that drives said third driven gear.

16. The gas turbine engine as set forth in claim 15, wherein the gear fixed to rotate with said first bevel gear is directly driven by said second driven gear, and said another gear fixed to rotate with said third bevel gear directly drives said third driven gear.

17. The gas turbine engine as set forth in claim 13, wherein an outer diametric envelope of said input gear may be defined, and said opposed side of said drive axis is outside said diametric envelope.

18. The gas turbine engine as set forth in claim 13, wherein said one accessory and said second accessory include at least a starter for selectively starting the gas turbine engine.

19. The gas turbine engine as set forth in claim 18, wherein said one accessory and said second accessory also include a generator for generating electricity from rotation of the turbine section.

20. The gas turbine engine as set forth in claim 18, wherein said one accessory and said second accessory also include a lube pump and a fuel pump for supplying lubrication and fuel to the gas turbine engine.

* * * * *